United States Patent
Halvardsson et al.

(10) Patent No.: US 10,513,075 B2
(45) Date of Patent: Dec. 24, 2019

(54) METHOD FOR LAMINATING A PROFILED FIBRE MOULDING

(71) Applicant: SIG Technology AG, Neuhausen am Rheinfall (CH)

(72) Inventors: Christer Halvardsson, Sunne (SE); David Kjellin, Karlstad (SE)

(73) Assignee: SIG Technology AG, Neuhausen am Rheinfall (CH)

( * ) Notice: Subject to any disclaimer, the term of this patent is extended or adjusted under 35 U.S.C. 154(b) by 60 days.

(21) Appl. No.: 15/515,372

(22) PCT Filed: Sep. 29, 2015

(86) PCT No.: PCT/EP2015/072369
§ 371 (c)(1),
(2) Date: Mar. 29, 2017

(87) PCT Pub. No.: WO2016/050739
PCT Pub. Date: Apr. 7, 2016

(65) Prior Publication Data
US 2017/0225384 A1    Aug. 10, 2017

(30) Foreign Application Priority Data

Sep. 30, 2014  (DE) .................. 10 2014 114 186

(51) Int. Cl.
*B29C 51/16* (2006.01)
*B32B 38/12* (2006.01)
(Continued)

(52) U.S. Cl.
CPC ............ *B29C 51/162* (2013.01); *B29C 51/08* (2013.01); *B29C 51/10* (2013.01); *B29C 51/266* (2013.01); *B29C 51/421* (2013.01); *B32B 5/02* (2013.01); *B32B 27/08* (2013.01); *B32B 27/12* (2013.01); *B32B 37/182* (2013.01); *B32B 38/12* (2013.01);
(Continued)

(58) Field of Classification Search
None
See application file for complete search history.

(56) References Cited

U.S. PATENT DOCUMENTS 2,796,634 A   6/1957 Chellis
3,657,044 A   4/1972 Singer
(Continued)

FOREIGN PATENT DOCUMENTS

DE   2037309       5/1971
DE   2547477 A1    4/1977
(Continued)

*Primary Examiner* — Barbara J Musser
(74) *Attorney, Agent, or Firm* — The Webb Law Firm

(57) ABSTRACT

Illustrated and described are a method and a device for laminating a profiled fibre moulding with a thermoplastic film. The film is laminated onto a surface of the fibre moulding to be coated by heat and differential pressure. To improve the lamination of the fibre moulding and to achieve uniform lamination thicknesses over the entire fibre moulding, the method includes the following steps: fixing at least an edge of the fed film to a base plate, heating the film, deforming the film via a moulding tool, feeding the fibre moulding, joining the fibre moulding to the pre-formed film, and removing the laminated fibre moulding.

8 Claims, 1 Drawing Sheet

(51) Int. Cl.
*B29C 51/08* (2006.01)
*B29C 51/10* (2006.01)
*B29C 51/26* (2006.01)
*B29C 51/42* (2006.01)
*B32B 5/02* (2006.01)
*B32B 27/08* (2006.01)
*B32B 27/12* (2006.01)
*B32B 37/18* (2006.01)
*B29K 105/12* (2006.01)
*B29K 701/12* (2006.01)
*B29L 31/00* (2006.01)

(52) U.S. Cl.
CPC .. *B29C 2791/001* (2013.01); *B29C 2791/006* (2013.01); *B29K 2105/12* (2013.01); *B29K 2701/12* (2013.01); *B29K 2905/02* (2013.01); *B29L 2031/712* (2013.01); *B32B 2250/24* (2013.01); *B32B 2305/10* (2013.01); *B32B 2305/22* (2013.01); *B32B 2310/0825* (2013.01)

(56) References Cited

U.S. PATENT DOCUMENTS

| | | |
|---|---|---|
| 4,092,201 A | 5/1978 | Wommelsdorf |
| 4,230,764 A | 10/1980 | Figge et al. |
| 5,228,546 A | 7/1993 | Chang et al. |
| 5,609,922 A | 3/1997 | McDonald |
| 2006/0284349 A1* | 12/2006 | Castiglioni .......... B29O 51/262 264/553 |
| 2008/0258354 A1 | 10/2008 | Polk et al. |
| 2011/0215603 A1 | 9/2011 | Gutt et al. |
| 2014/0182875 A1 | 7/2014 | Sprenger et al. |
| 2015/0064300 A1* | 3/2015 | Wang .................... B29O 33/42 425/405.1 |
| 2015/0283730 A1* | 10/2015 | Kakimoto .............. B29O 70/44 264/138 |

FOREIGN PATENT DOCUMENTS

| | | |
|---|---|---|
| DE | 2547814 A1 | 4/1977 |
| DE | 3607647 A1 | 9/1987 |
| DE | 102005023945 A1 | 12/2006 |
| GB | 1328380 | 8/1973 |
| JP | S601548 U | 1/1985 |
| JP | H0414431 A | 1/1992 |
| JP | H05176855 A | 7/1993 |
| JP | H10509667 A | 9/1998 |
| JP | 200776011 A | 3/2007 |
| JP | 2010524727 A | 7/2010 |
| JP | 2012245623 A | 12/2012 |
| JP | 2014136391 A | 7/2014 |
| WO | 9305943 | 4/1993 |
| WO | WO-2014069503 A1 * | 5/2014 ............ B29C 70/44 |

* cited by examiner

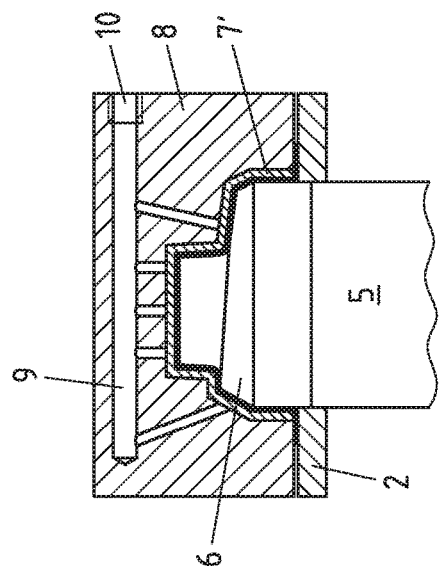
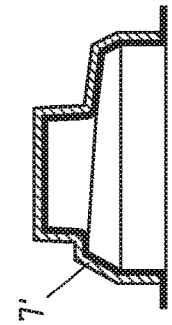
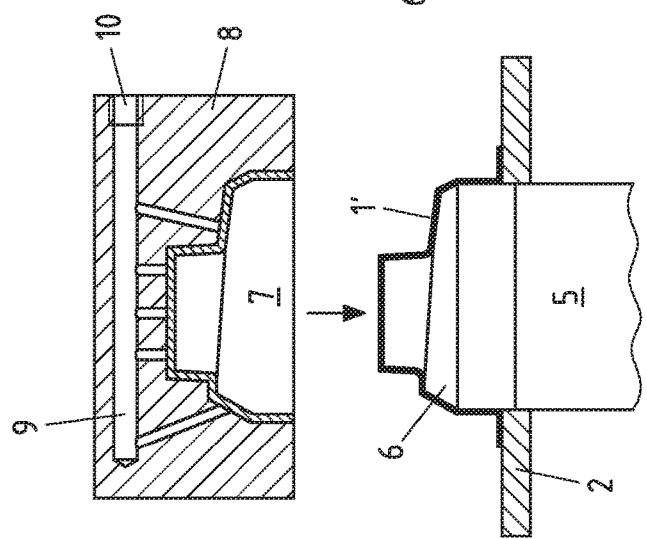
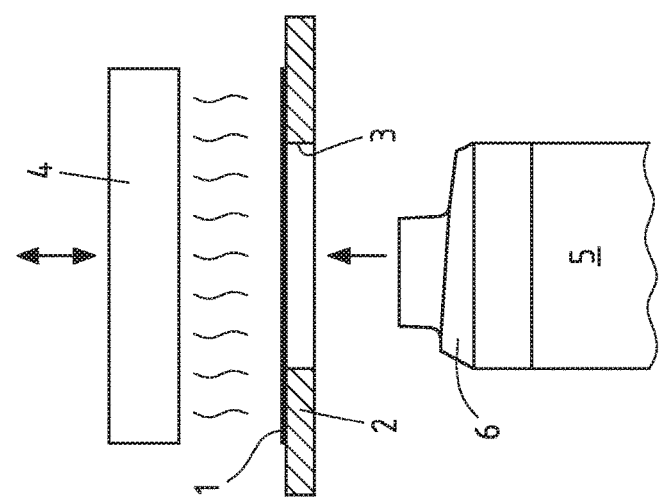

METHOD FOR LAMINATING A PROFILED FIBRE MOULDING

CROSS-REFERENCE TO RELATED APPLICATIONS

This application is the United States national phase of International Application No. PCT/EP2015/072369 filed Sep. 29, 2015, and claims priority to German Patent Application No. 10 2014 114 186.5 filed Sep. 30, 2014, the disclosures of which are hereby incorporated in their entirety by reference.

BACKGROUND OF THE INVENTION

Field of the Invention

The invention relates to a method and to a device for laminating a profiled fibre moulding with a thermoplastic film, wherein the film is laminated onto the surface of the fibre moulding to be coated by means of heat and differential pressure.

Description of Related Art

Generally, joining processes have long been the usual state of the art. Thus, U.S. Pat. No. 2,796,634 shows, by way of example, a moulding and joining process for mouldings made from two relatively solid layers. In these processes, the external surface is to remain as undamaged as possible and thus provide an intact face side of, for example, household appliances and furniture. For this purpose, the outer layer is initially thermally heated and mechanically pre-formed by means of one rigid and one movable mould half, thus bringing it closer to the later shape. The two layers are subsequently connected and the moulding brought into its final shape.

In addition, it has long been known to coat even profiled fibre mouldings with difficult geometries with a thermoplastic film by laminating fibre moulding and film to each other. A gas- or fluid-tight coating is desirable by way of example if the fibre mouldings are to be used as packaging elements for containers for liquids such as drinks or food.

It is known from U.S. Pat. No. 3,657,044 to coat a profiled fibre moulding with a thin thermoplastic film by incorporating the film under the effect of heat and vacuum into the fibre moulding and laminating it thereto. This method has proven itself with respect to the older spraying or dipping methods. The film is fixed between two mould components in the process in order to be immovably fixed at its outer edge. The construction effort for this known laminating method is considerable and a uniform thickness of the laminated film can only be achieved with simple geometries.

Further thermoforming methods for laminating profiled fibre mouldings with a thermoplastic film are known separately from DE 25 47 477 A1 and DE 25 47 814 A1.

DE 25 47 477 A1 describes a device and a method for conducting air into the thermoforming station of thermoplastic films. It deals in particular with the conduction of air and different temperatures during lamination. To avoid cooling of the heated film by the impinged vacuum it is proposed to vault the heated film by means of a stamp in the direction of the surface of the fibre moulding to be coated.

DE 25 47 814 A1 describes a machine for lining paper cups with a plastics material film that is to be thermoformed into the cup. Closed moulds are no longer used here and instead the individual film sections are mechanically fixed to a circumferential frame. Both of the documents mentioned above disclose a pure thermoforming method for final deformation of the plastics material film used, however.

SUMMARY OF THE INVENTION

Taking this as a starting point, the present invention is based on the object of designing and developing the method and device, mentioned in the introduction and described above in more detail, for laminating a profiled fibre moulding with a thermoplastic film in such a way that lamination of the fibre moulding is improved as a whole since a reduction in material can be made by using thinner films, and wherein particularly uniform lamination thicknesses can be achieved over the entire fibre moulding.

According to the method, the solution to the object occurs by way of the following steps:
 fixing at least the edge of the fed film to a base plate,
 heating the film,
 plastic deformation of the film by means of a moulding tool,
 removing the positive moulding tool,
 feeding the fibre moulding,
 joining the fibre moulding to the pre-formed film and
 removing the laminated fibre moulding.

The corresponding device achieves said object by a base plate having an opening for fixing at least the edge of the film, a heating device for heating the film, a moulding tool for plastic deformation of the film, a die for feeding the fibre moulding and removing the laminated fibre moulding and a differential pressure unit.

The invention has recognised that better and more uniform deformation of the film can occur if it is not pressed or sucked onto the surface of the fibre moulding to be coated solely by overpressure or vacuum. Instead a combination of a "die stamp" with the known thermoforming method delivers better results, with it even being possible to reduce the film thicknesses used, so—in particular with mass-produced products—significant reductions in material have become possible. The thickness of the film to be used is determined primarily by the intended application. If the coating of the fibre moulding has led to adequate gas and liquid tightness, however, the quality is not improved further by a thicker film. Conversely, this means that the reduction in the film thickness for a saving of material presents a significant challenge to the technology to be used.

A further teaching of the invention provides that the film is fixed to the base plate by means of a vacuum. Alternatively, a purely mechanical fixing of at least the edge of the film is also possible, however.

In a further embodiment of the invention the film can preferably be heated by means of infrared radiation or by hot air.

A further preferred embodiment provides that the film can also or additionally be heated by means of a heater in the moulding tool. It is also expedient to pre-heat the fibre moulding to achieve optimum crosslinking between the thermoplastic film and the surface of the fibre, and to prevent premature cooling of the film on contact with the fibre moulding.

According to a further teaching of the invention it is provided that a vacuum can be applied to the moulding tool to obtain a particularly uniform thickness of the fibre moulding.

In a further embodiment of the invention it is provided that the moulding tool is designed as a positive shape and the profiled end of the moulding tool has a geometry that corresponds to the inner shape of the fibre moulding. Here the moulding tool acts as a "stamping tool" as it were, so the deformed film is already pre-shaped into its subsequent shape even before joining to the fibre moulding. The moulding tool preferably also has a heating device for this purpose. The die can preferably also be heated for the joining process of film/fibre moulding.

According to a further embodiment of the invention the moulding tool has at least one vacuum opening at the profiled end. The profiled end of the moulding tool can be made at least partly from foamed aluminium. According to a further teaching of the invention the base plate also has at least one vacuum opening in the edge region of the film for fixing the film, or is made from foamed aluminium at this location. The film can therefore be guided close to the moulding tool to achieve optimum plastic deformation.

As already mentioned for the heating method, an infrared or hot air device is preferably provided as the heating device.

In a further embodiment the die has a plurality of holes which form a channel system which can be attached to the differential pressure unit. The differential pressure unit is preferably designed as a vacuum unit and is therefore capable of also feeding the fibre moulding from above the film pre-deformed on the profiled end of the moulding tool since the fibre mould is held in the cavity of the die by means of a vacuum.

BRIEF DESCRIPTION OF THE DRAWINGS

The invention will be explained in detail below with reference to a drawing illustrating just one preferred embodiment.

In the drawing:

FIG. 1A-1C show the individual steps of the production method in a schematic view, and FIG. 2 shows a laminated fibre moulding.

DESCRIPTION OF THE INVENTION

FIG. 1A shows that to carry out the method according to the invention a film 1 is placed on a base plate 2 which has an opening 3 in the centre.

The film 1 is then heated from above by means of a heating device 4. The film 1 is fixed by suitable means against slipping at least at its edge to the holding plate 2. A fixing of this kind can occur by means of applied vacuum or mechanically.

The heated and therefore elastic film 1 is then pre-deformed by raising a moulding tool 5 through the opening 3. For this purpose, the profiled end 6 of the moulding tool 5 has a positive shape which corresponds with the geometry of the inner shape of the fibre moulding 7.

In FIG. 1B the moulding tool has reached its end position and it can clearly be seen that the thermoplastic film has adapted to the profiled shape of the end 6 of the moulding tool 5 and is therefore denoted here by the reference numeral 1'. The fibre moulding 7 that is yet to be lowered can already be seen above the film 1', and this is held in a die 8 whose negative shape matches the outer geometry of the fibre moulding 7. Distributed over the surface of this negative shape can be seen a channel system of a wide variety of holes 9 through which a vacuum can be exerted on the negative shape, and therewith the fibre moulding 7 located therein, via a port 10.

FIG. 1C finally shows that the die 8 has been lowered onto the pre-shaped film 1', so the actual lamination occurs between the film and the fibre moulding 7 in this position. Before, during or after the lamination process the moulding tool is removed downwards from the fibre moulding 7'. After cooling and opening of the mould, both parts form a laminated fibre moulding 7' which is shown again separately in FIG. 2.

It is understood that the illustrated schematic diagram of the inventive method serves only to explain the method steps and should not signify any kind of restriction for the tools and/or moulds used.

The invention claimed is:

1. A method for laminating a profiled fibre moulding for packaging elements with a thermoplastic film using a heating device and a moulding tool, wherein the film is laminated to a surface of the fibre moulding to be coated by heat and differential pressure, the method comprising the following steps:
    fixing at least an edge of the fed film to a base plate,
    heating the film,
    plastically deforming the film only using the positive moulding tool so that the film adjusts to a profiled shape of an end of the moulding tool,
    providing the fibre moulding in a die,
    moving the die onto the positive moulding tool,
    applying the fibre moulding in the die to the film on the positive moulding tool,
    joining the fibre moulding to the pre-formed film to form a laminated fibre moulding, and
    removing the laminated fibre moulding from the die.

2. The method according to claim 1, wherein the film is fixed to the base plate by a vacuum.

3. The method according to claim 1, wherein the film is mechanically fixed to the base plate.

4. The method according to claim 1, wherein the film is heated by infrared radiation.

5. The method according to claim 1, wherein the film is heated by hot air.

6. The method according to claim 1, wherein the film is heated by a heater in the moulding tool.

7. The method according to claim 1, wherein the fibre moulding is heated before lamination.

8. The method according to claim 1, wherein a vacuum is adapted to be applied to the moulding tool.

* * * * *